March 31, 1964  J. A. PETRIE  3,127,129
VTOL AIRCRAFT ENGINE
Filed March 19, 1962  2 Sheets-Sheet 1
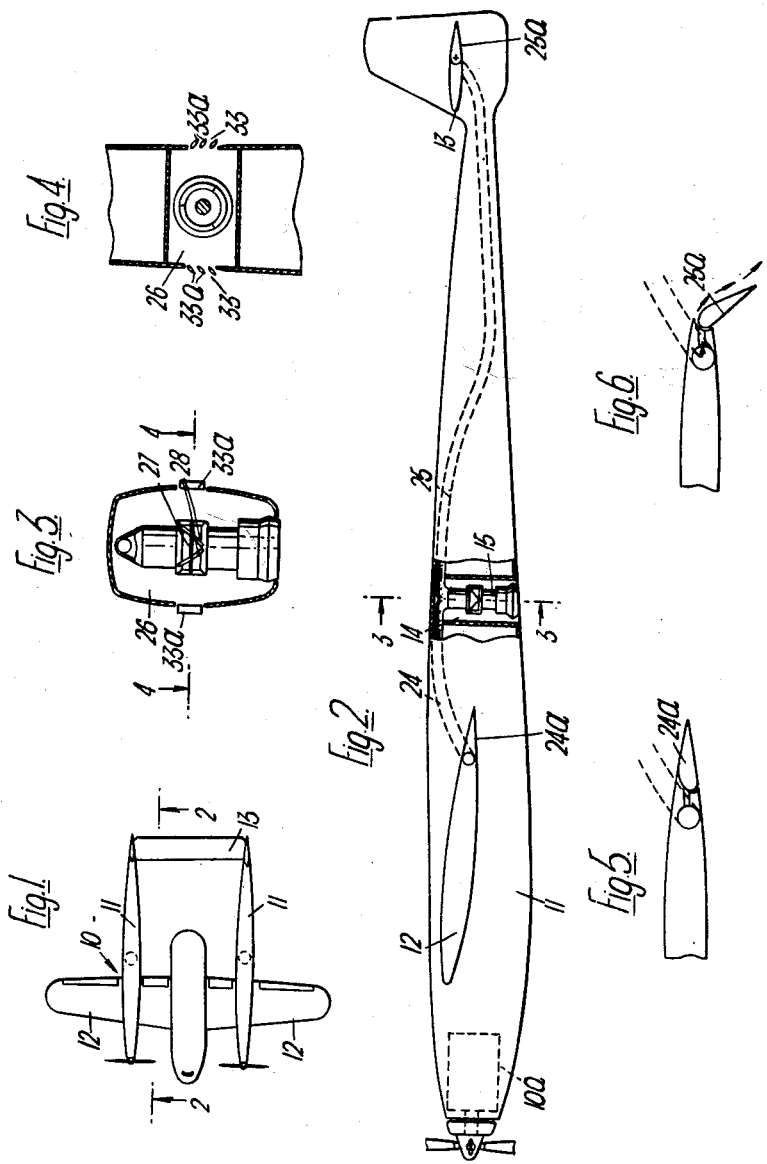
Inventor
James Alexander Petrie
By
Cushman, Darby & Cushman
Attorneys

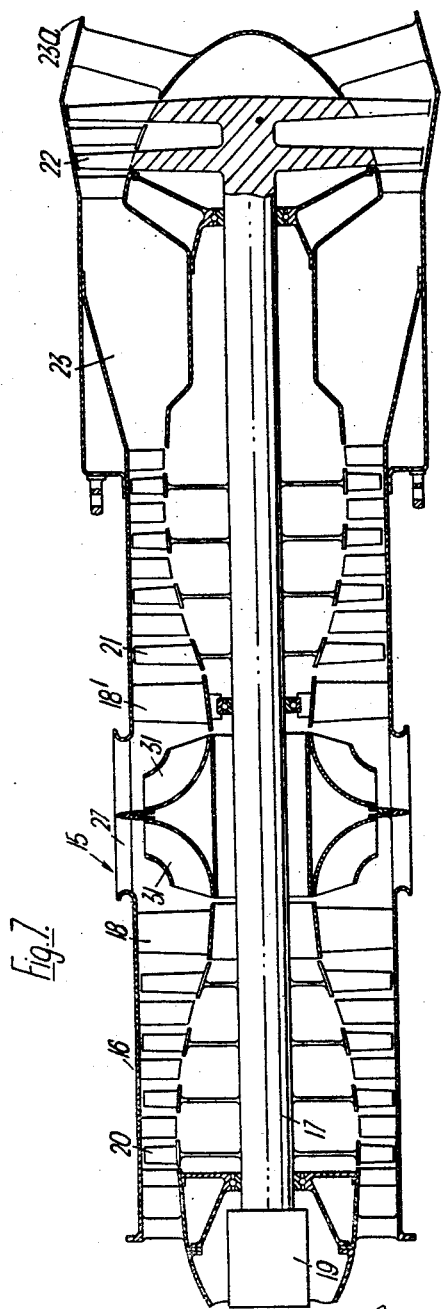

United States Patent Office 3,127,129
Patented Mar. 31, 1964

3,127,129
VTOL AIRCRAFT ENGINE
James Alexander Petrie, Littleover, Derby, England, assignor to Rolls-Royce Limited, Derby, England, a company of Great Britain
Filed Mar. 19, 1962, Ser. No. 180,719
Claims priority, application Great Britain Apr. 5, 1961
9 Claims. (Cl. 244—23)

This invention concerns aircraft.

According to the present invention, an aircraft is provided with at least one vertically mounted gas turbine engine whose rear end is downwardly directed, the or each vertically mounted gas turbine engine having compressor means which are arranged to supply compressed air to one or more conduits by means of which the said compressed air is taken to one or more points of use on the aircraft.

Preferably the said compressed air is employed to produce lift forces on the aircraft.

The aircraft is preferably provided with blown flaps which are provided with compressed air from the said conduit or conduits.

The aircraft may be provided with two booms each of which is provided with a said vertically mounted gas turbine engine.

Flap members may be provided for directing air into the air intake of the or each said vertically mounted gas turbine engine.

Alternatively, the aircraft, instead of being provided with the said blown flaps, may be a rotary ring aircraft having a rotor carried by a pylon beneath which is mounted a plurality of the said vertically mounted gas turbine engines, the condiut or conduits being carried by or forming part of the pylon and being adapted to direct the compressed air onto the rotor to drive it.

Preferably the or each said vertically mounted gas turbine engine comprises two compressors which are arranged with their inlets facing each other and are driven by the turbine means of the engine, the or each said vertically mounted gas turbine engine having an air intake which is disposed between said compressors and which is provided with walls which respectively direct the air into the inlets to the two compressors.

The two compressors of the or each vertically mounted gas turbine engine may be mounted on a common shaft which is driven by the turbine means of the engine.

Alternatively, the two compressors of the or each vertically mounted gas turbine engine may be respectively mounted on two shafts one of which is mounted within the other, the turbine means of the or each said engine comprising two turbines one of which drives one shaft and the other of which drives the other shaft.

The invention is illustrated, merely by way of example, in the accompanying drawings, in which:

FIGURE 1 is a plan of an aircraft according to the present invention provided with vertically mounted gas turbine engines.

FIGURE 2 is a section, on a larger scale, taken on the line 2—2 of FIGURE 1,

FIGURES 3 and 4 are enlarged sections taken respectively on the lines 3—3 of FIGURE 2 and 4—4 of FIGURE 3, FIGURES 5 and 6 illustrate blown flaps which are used on the aircraft of FIGURE 1, and FIGURE 7 is a section (shown horizontally, for convenience) through a vertically mounted gas turbine engine forming part of the structure shown in FIGURES 1–3.

Referring to the drawings, an aircraft 10 (FIG. 1), which is adapted for vertical take-off and landing, is provided with two booms 11, wings 12 and tailplane 13.

In each of the booms 11 (FIG. 2) there is an engine compartment 14 within which there is a vertically mounted gas turbine engine 15 whose rear end is downwardly directed. The aircraft 10 is also provided with engines 10a for forward propulsion.

Each of the engines 15 (see FIGS. 7) comprises an engine casing or substantially straight line flow ducting 16 within which is rotatably mounted a shaft 17. On the shaft 17 there are mounted two multi-stage axial compressors 20, 21 which are respectively provided with inlet guide vanes 18, 18' and which are arranged with their inlets facing each other. Also mounted on the shaft 17 is a fuel supply control unit 19 and a two-stage axial turbine 22 which drives the compressors 20, 21, and the unit 19.

The air which has been compressed by the compressor 21 passes to combustion equipment 23, the hot gases from the combustion equipment 23 passing through the turbine 22 and thence through a final nozzle 23a to atmosphere. It will now be obvious that the air passing through the compressor 21 to the combustion equipment 23 and the hot gases from the combustion equipment 23 passing through the tubrine 22 flow in a substantially straight line with no major curves or changes in direction.

The air which has been compressed by the compressor 20 passes via conduits 24, 25 (FIG. 2) to blown flaps 24a and 25a at the wings 12 and tailplane 13 respectively.

The compressor 21 of each engine 15 thus provides the compressed air employed in the operation of the engine, while the compressor 20 is an additional compressor whose compressed air is not employed in the operation of the engine but is taken to points of use on the aircraft.

The engine casing 16 of each engine has an annular opening 27 which leads to annular space 26 (FIG. 3). Each opening 27 is braced by diagonal struts 28 and may be provided with an outer protective mesh (not shown) to prevent the ingress of debris.

Each engine intake includes guide plates 31 (FIG. 7) which respectively direct air into the inlets of the compressors 20, 21.

The annular space 26 receives air through intakes 33 provided in the wall of each boom 11. Each intake 33 is provided with flap members 33a which are forwardly directed (or are pivotally mounted so that they may be moved to a forwardly directed position), whereby, when the aircraft is in forward flight, air will be directed into the space 26 to assist starting of the engines 15. When the engines 15 are inoperative, the flap members 33a may be moved to a position in which they close-off the intakes 33 and form a smooth continuation of the skin of the boom 11.

The engines 15 are preferably adapted to be used only for very short periods during vertical take-off and landing. They may therefore be of lightweight construction and their compressors 20, 21 may be made of synthetic resinous material. In spite, however, of this lightweight construction, the engines 15 are preferably adapted to produce a large quantity of compressed air.

Since the engines 15 are vertically mounted their jet exhausts are downwardly directed and therefore assist the vertical take-off and landing of the aircraft 10.

If, on the other hand, the engines 15 were mounted horizontally their jet exhausts would not assist vertical take-off and landing to an equal extent since even if the jet exhausts were downwardly deflected this downward deflection would involve a loss of thrust.

Moreover if the engines 15 were mounted horizontally and their jet exhausts were not downwardly deflected they would positively interfere with the vertical take-off and landing. Thus if they were deflected rearwardly they would provide an undesired forward thrust while if they were deflected sideways or obliquely, pitching and yawing couples would be produced on the aircraft which would be particularly serious if one engine were to fail.

The engines 15, instead of being mounted on a twin-boom aircraft, could be employed on a rotary wing aircraft such as a helicopter. Thus the helicopter could be provided which rotors carried by a main rotor pylon beneath which are vertically mounted four engines 15, the output of whose compressors 20 are directed through a duct in the pylon and onto the helicopter rotors to drive them.

If desired, instead of mounting the compressors 20, 21 and turbine 22 on a common shaft 17, the compressor 20 may be mounted on a shaft which is disposed concentrically within the shaft 17 and is driven by a low pressure "free power" turbine, which may be a single stage turbine. In this case, the shaft 17 will merely carry the compressor 21 and an high pressure turbine, which may also be a single stage turbine. In other words, the two-stage turbine 22 may, in effect, be split into two single stage turbines which respectively drive the compressors 20, 21.

The inlet guide vanes 18 of the compressor 20 may, if desired, be two-position inlet guide vanes which may be moved by a pneumatic ram (not shown) between an operative position and an inoperative position in which they throttle the intake to the compressor 20 and therefore reduce the power required to start the engine. The said pneumatic ram may be operated by the compressor delivery air supplied by the compressor 21, the arrangement being such that the pneumatic ram would move the inlet guide vanes to the operative position only when the pressure of the compressor delivery air had reached a predetermined value i.e. only when the operation of the engine had become self-sustaining.

I claim:

1. An aircraft comprising two booms, at least one gas turbine engine mounted vertically in each boom, each of said engines having compressor means and a downwardly directed rear end, conduit means supplied with compressed air from the compressor means of each of said engines, and blown flaps on said aircraft for increasing lift forces acting on the aircraft, said blown flaps being blown with compressed air from said conduit means.

2. An aircraft as claimed in claim 1 in which the compressor means of each engine comprises two coaxial, axially spaced compressors, each of said compressors having an air inlet, said air inlets of the two compressors of each engine being located adjacent one another and intermediate the two compressors, each engine having turbine means arranged to drive the two compressors thereof, one of the two compressors of each engine communicating with the turbine means for that engine and driving the same, and the other of the two compressors of each engine communicating with said conduit means.

3. An aircraft as claimed in claim 2 in which each boom is provided with walls defining an engine compartment therein in which said at least one gas turbine engine of that boom is mounted, said walls and said at least one gas turbine engine mounted therein defining a space therebetween with which said air inlets of that gas turbine engine communicate, said walls being provided with air intake means for supplying atmospheric air from the exterior of the aircraft to said space in each engine compartment.

4. An aircraft as claimed in claim 3 in which said air intake means comprises flap members located laterally of each boom in horizontal alignment with the air inlets of said at least one gas turbine engine mounted in that boom.

5. In an aircraft provided with a vertically mounted gas turbine engine having a downwardly directed rear end, and fixed structure forming upper and lower external surfaces of the aircraft whose vertical spacing is as small as possible and is determined by the overall vertical length of the engine, the engine providing an ancillary compressed air supply, the improvement comprising: said engine having two compressors and turbine means driving said two compressors; each of said compressors having an air inlet, the air inlets of the two compressors being located adjacent one another and intermediate said two compressors; said turbine means communicating with one of said compressors; the other of said compressors having an ancillary compressed air outlet; conduit means communicating with said ancillary compressed air outlet for delivering compressed air to a point of use on the aircraft; said ancillary compressed air outlet being located closely adjacent said upper external surface of the aircraft; and said other compressor, said one compressor and said turbine means extending downwardly successively in that order from said ancillary compressed air outlet.

6. An aircraft comprising fixed structure forming upper and lower external surfaces of the aircraft; at least one gas turbine engine mounted vertically in said fixed structure, said engine having two compressors and turbine means driving said two compressors; each compressor having an air inlet, the air inlets of the two compressors being located adjacent one another and intermediate said two compressors; said turbine means communicating with one of said compressors; the other of said two compressors having a compressed air outlet; conduit means communicating with said compressed air outlet for delivering compressed air to a point of use on the aircraft; a downwardly directed jet discharge outlet receiving turbine exhaust gases from said turbine means; said compressed air outlet of the other of said two compressors and said jet discharge outlet of said turbine means being respectively located closely adjacent said upper and lower external surfaces of the aircraft; said other compressor, said one compressor and said turbine means extending successively in that order between said compressed air outlet of said other compressor and said jet discharge outlet of said turbine means.

7. An aircraft as claimed in claim 6 in which said fixed structure includes walls defining an engine compartment in which said at least one engine is mounted, said walls and said at least one engine defining a space therebetween with which said air inlets of the two compressors of the engine communicate, said walls being provided with air intake means for supplying atmospheric air from the exterior of the aircraft to said space in said engine compartment.

8. An aircraft as claimed in claim 7 in which said air intake means comprises flap members located laterally of the aircraft in horizontal alignment with the air inlets of the two compressors of said at least one engine.

9. An aircraft comprising at least one vertically mounted gas turbine engine in the aircraft, said gas turbine engine comprising two multi-stage axial flow compressors which are axially aligned and arranged with their inlets facing each other, combustion equipment and turbine means arranged in axial flow series, said turbine means being axially aligned with said compressors, substantially straight line flow ducting, including said combustion equipment connecting one of said compressors and said turbine means whereby compressed air from the one of said compressors is supplied in a substantially straight line direction from the one of said compressors to the combustion equipment and exhaust gases from said combustion equipment is supplied in a substantially straight line direction to and through said turbine, the other of said compressors having an outlet for delivering compressed air to auxiliary equipment requiring compressed air, shafting connecting both said compressors to said turbine means, said turbine driving said compressors, and an air intake which is disposed between the two said inlets to the two compressors, said air intake having walls which respectively direct the air into the inlets to the two compressors.

References Cited in the file of this patent

UNITED STATES PATENTS

| | | |
|---|---|---|
| 1,373,409 | Caspar | Apr. 5, 1921 |
| 2,518,062 | Pouit | Aug. 8, 1950 |
| 2,734,699 | Lippisch | Feb. 14, 1956 |
| 2,870,978 | Griffith | Jan. 27, 1959 |

FOREIGN PATENTS

| | | |
|---|---|---|
| 808,493 | Great Britain | Feb. 4, 1959 |

OTHER REFERENCES

Flight Magazine, London, June 10, 1960, pages 793–799.